(12) United States Patent
Gibbs et al.

(10) Patent No.: US 10,926,595 B2
(45) Date of Patent: Feb. 23, 2021

(54) AMPHIBIAN

(71) Applicant: GIBBS TECHNOLOGIES LIMITED, Nuneaton (GB)

(72) Inventors: Alan Timothy Gibbs, London (GB); Simon James Longdill, Nuneaton (GB)

(73) Assignee: Gibbs Technologies Limited, Warwickshire (GB)

( * ) Notice: Subject to any disclaimer, the term of this patent is extended or adjusted under 35 U.S.C. 154(b) by 408 days.

(21) Appl. No.: 15/579,724

(22) PCT Filed: Jun. 8, 2016

(86) PCT No.: PCT/GB2016/051697
§ 371 (c)(1),
(2) Date: Dec. 5, 2017

(87) PCT Pub. No.: WO2016/198865
PCT Pub. Date: Dec. 15, 2016

(65) Prior Publication Data
US 2018/0170133 A1 Jun. 21, 2018

(30) Foreign Application Priority Data

Jun. 8, 2015 (GB) ..................................... 1509932

(51) Int. Cl.
*B60F 3/00* (2006.01)
*B60G 3/20* (2006.01)

(52) U.S. Cl.
CPC .............. *B60F 3/0084* (2013.01); *B60G 3/20* (2013.01); *B60F 2301/04* (2013.01); *B60G 2200/144* (2013.01); *B60G 2300/12* (2013.01); *B60G 2300/28* (2013.01)

(58) Field of Classification Search
CPC ... B60F 3/0084; B60G 3/20; B60G 2200/144; B60G 2300/12
See application file for complete search history.

(56) References Cited

U.S. PATENT DOCUMENTS

| 2013/0126666 | A1* | 5/2013 | Brown | ...................... B60F 5/02 244/2 |
| 2018/0170133 | A1* | 6/2018 | Gibbs | ................... B60F 3/0084 |
| 2018/0178893 | A1* | 6/2018 | Gibbs | .................... B63H 23/10 |

FOREIGN PATENT DOCUMENTS

WO   WO-2009153561 A1 * 12/2009   ............ B60F 3/0069

* cited by examiner

*Primary Examiner* — S. Joseph Morano
*Assistant Examiner* — Jovon E Hayes
(74) *Attorney, Agent, or Firm* — Price Heneveld LLP

(57) ABSTRACT

The present invention includes a retractable single front wheel or track drive assembly for an amphibian comprising a single front wheel or track drive. The retractable single front wheel or track drive assembly comprises an actuator, a suspension assembly movable between a protracted position and a retracted position, and a single front wheel or track drive. When the suspension assembly is protracted then the suspension assembly supports and/or holds the single front wheel or track drive in a ground engaging position for use on land, and the front single wheel is moved forward and upwards on retraction. The present invention also provides a retractable single rear wheel or track drive assembly for an amphibian. The present invention further provides an amphibian comprising the retractable single front or rear wheel or track drive assembly.

15 Claims, 3 Drawing Sheets

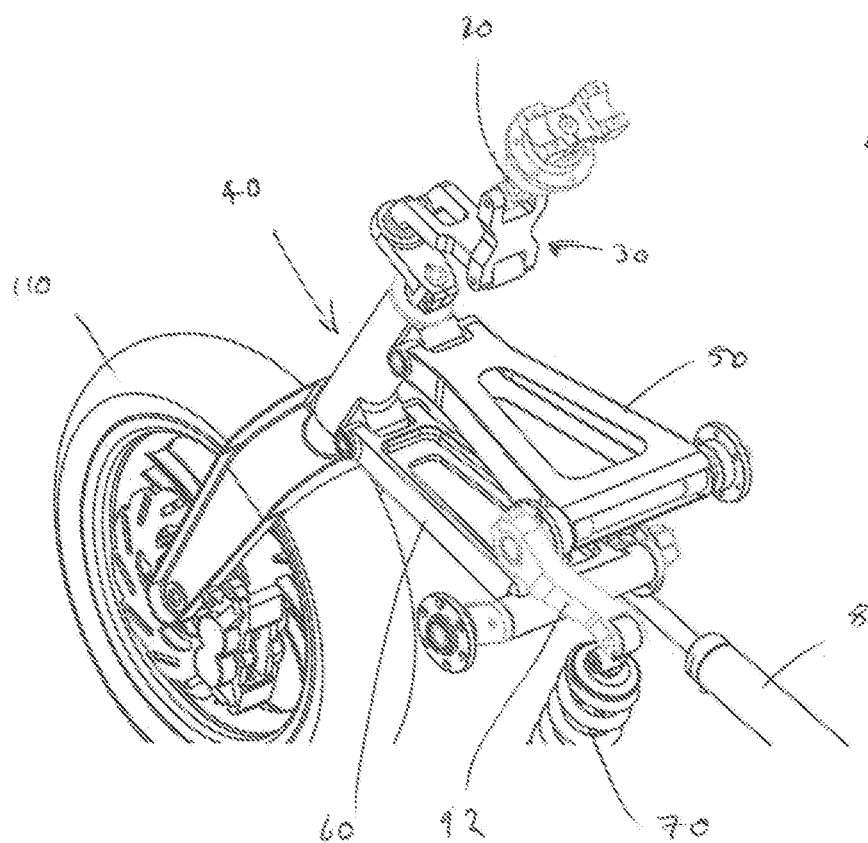
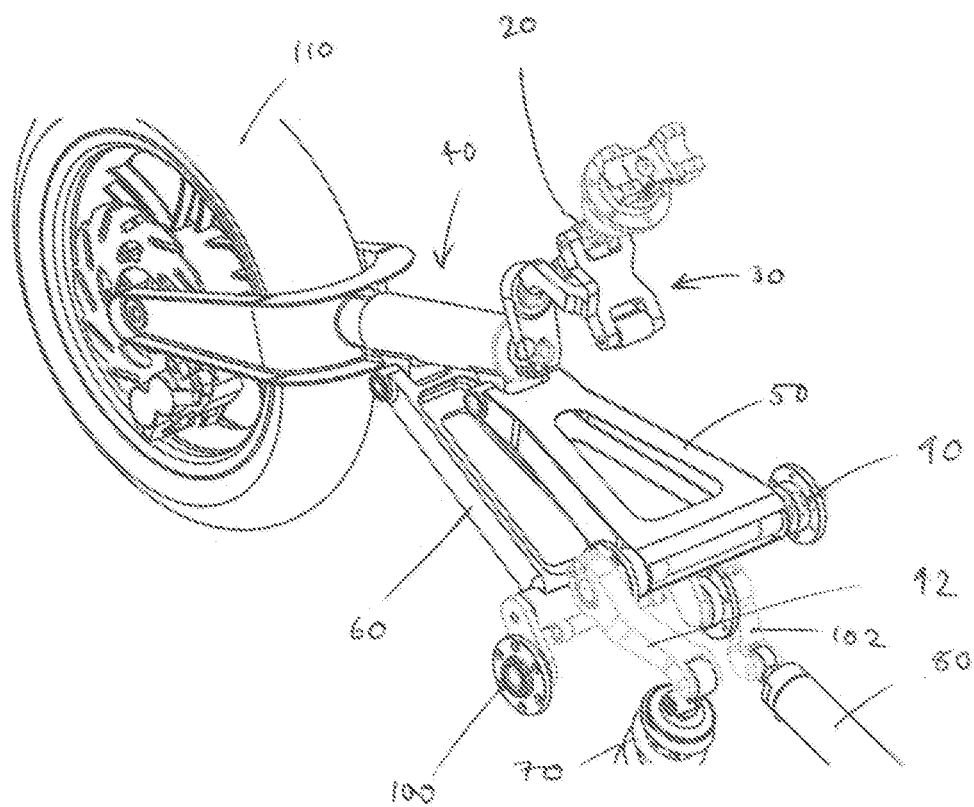

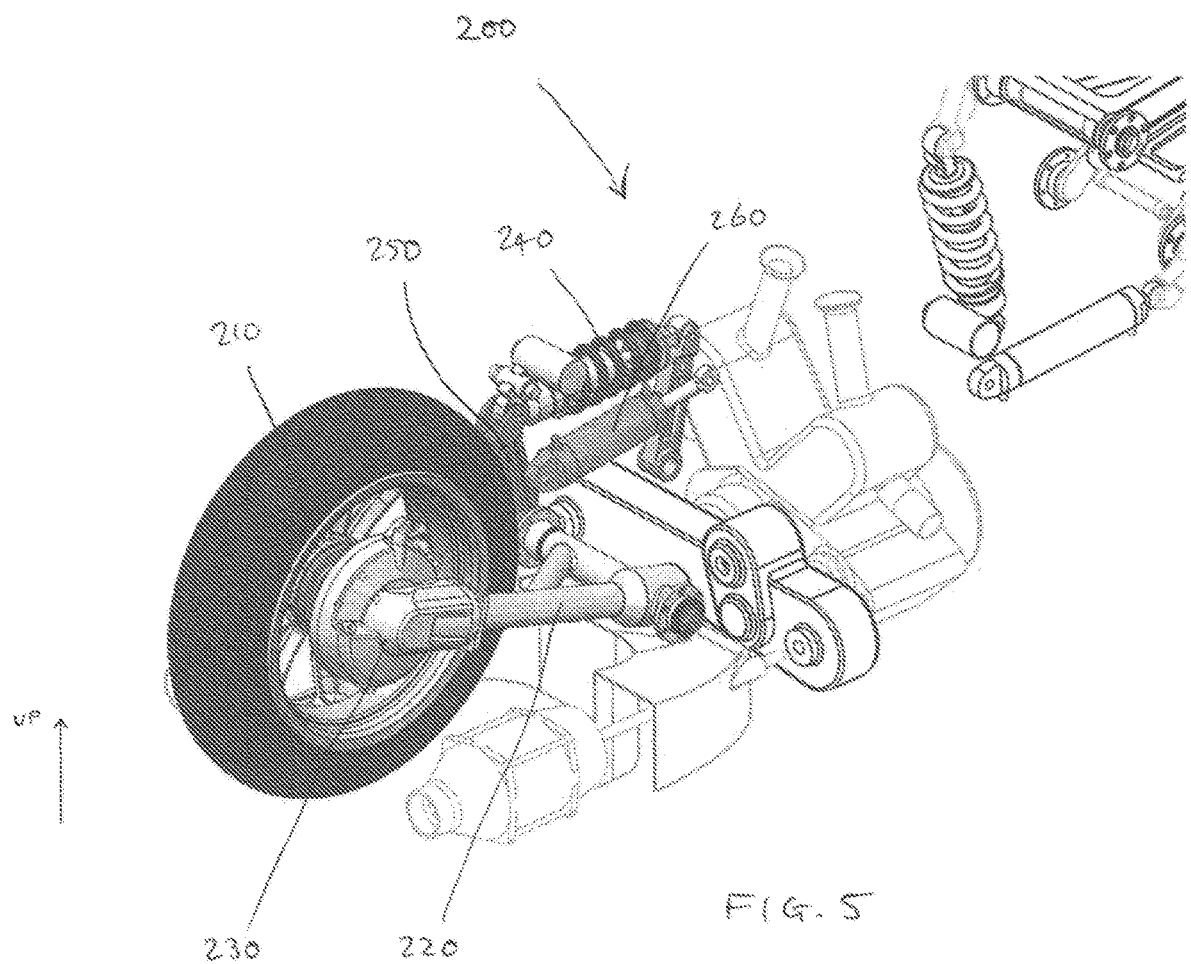

AMPHIBIAN

The present invention relates to an amphibian and, in particular, to a high speed amphibian motorcycle (or tricycle) configured with a single retractable front wheel or track station, and/or a single retractable front wheel or track assembly. The present invention also relates to a retractable rear wheel or track station, and/or a retractable rear wheel or track assembly, and to an amphibian incorporating one or more of these.

Amphibians for recreation, business, and/or military uses are known. In the past, designers of amphibians have focussed their efforts on optimising either on-water or on-land performance. As a result, either on-water performance has been sacrificed in order to give satisfactory on-land performance, or on-land performance sacrificed in order to give satisfactory on-water performance. The resulting amphibians are compromised to one degree or other.

To enable an amphibian to attain greater speed on water, it is desirable for the amphibian to be provided with a planing hull. Such a hull can be powered from standing, where it is fully displaced, to a speed where it can generate sufficient hydrodynamic lift to rise up out of the water and plane across the surface of the water. It is known for such amphibians to have a retractable wheel assembly that enables the wheels of the amphibian to be raised to a retracted position during use of the amphibian on the water. In addition, a hull provides buoyancy to the amphibian such that it floats while in the water.

Generally, for optimal performance, the surface of a planing hull should contain as few discontinuities as possible, as disruptions to the surface of the hull will increase drag and compromise both the hydrodynamic lift achievable and handling on water. However, the nature of an amphibian is such that it can require the surface of the hull to contain discontinuities, such as recesses within which components, for example wheel and suspension assemblies, are located. When attempting to optimise on-water performance, designers of amphibians with retractable wheel and suspension assemblies have expended great effort in providing movable cover mechanisms for wheel arch cut outs to re-establish the smooth uninterrupted lines of a conventional marine hull when the wheels are retracted. Movable covers and plates are known in amphibians for example from U.S. Pat. No. 4,958,584 (Williamson), U.S. Pat. No. 3,421,472 (Oberg), and U.S. Pat. No. 3,280,785 (Oberg). The sliding and/or hinging mechanisms of movable covers or plates are liable to seize up through corrosion, and/or through ingress of mud, sand, silt, salt, or other marine debris. They may also be damaged through collision with objects such as rocks during vehicle mode conversion or off-road use. An amphibian which cannot change mode may be immobilized; either on land, or even worse, on water. Furthermore, the necessity of maintaining and scrupulously cleaning sliding and/or hinging mechanisms may not likely be acceptable to the vehicle owner, who will be accustomed to the less onerous demands of modern cars and boats. Although movable covers or plates have been proposed in several amphibians patents as noted above, these have not made it to series production.

Hulls for amphibians comprising three or more wheels, at least two of which are provided at the front of the amphibian, typically provide sufficient buoyancy on water since the width of the amphibian, and thus the hull, span the width of the front and/or rear axle plus wheels. However, an amphibian having just one front wheel or wheel station presents unique challenges with respect to the hull shape, size, displacement etc., and for wheel retraction since the amphibian can be required to lean sideways during riding/turning on land, thereby requiring a hull with a relatively narrow width at least at the front, yet the hull must provide sufficient buoyancy to keep the amphibian afloat in the water. Prior art amphibian motorcycles have attempted to meet these challenges using additional movable flotation elements that extend from the hull while the amphibian is in the water. These movable flotation elements may take the form of inflatable bellows, movable or foldable flotation aids, or other forms. Such systems have been bulky, required additional moving parts/components, and can be prone to failure. As such, an amphibian motorcycle with a hull that does not require additional bellows, provides sufficient buoyancy for the amphibian to float in the water, and yet allows the amphibian to adequately lean/turn while on land is desirable.

The applicant has developed a high speed amphibian with a single front wheel or track station, and/or single retractable front wheel or track assembly. The amphibian comprises one or more rear wheel or track stations, and/or one or more retractable rear wheel(s) or track(s) assemblies. Accordingly, the high speed amphibian may take the form of a motorcycle, tricycle or other configuration having a single front wheel or track station, and/or single front wheel or track. The amphibian can plane on water, yet has on-road, off-road and utilitarian capability. Surprisingly, this new amphibian capability has been achieved without using additional movable flotation elements that extend from the hull while the amphibian is in the water. To this end, the applicant has gone against conventional thinking and overcome previous technical prejudices in arriving at the configuration according to the present invention.

In particular, the applicant has developed a retractable wheel assembly capable of providing steering, suspension and the ability to retract, optimised for use in a high speed amphibian with a single front wheel or track station, and/or single front wheel or track. A retractable rear wheel or track assembly is also provided. The present invention addresses:

1. Transfer of the rider's steering input to the front wheel as direct as possible: i.e. with as little play as possible. This is very important for land dynamics;
2. Carrying of the brake components;
3. Transfer of the braking forces from the front wheel contact patch to the vehicle body;
4. Absorpsion of road irregularities by means of a spring and damping system;
5. Minimal intrusion of components into the bodywork in order to maximise buoyancy;
6. Connections to/through the body work are water tight;
7. Eliminates or reduces the rider's steering input from the front wheel in water mode—maximises buoyancy and overturned righting moment;
8. A retraction of the front wheel vertically in water mode, without compromising the bow shape required for marine performance;
9. Fast retraction and deployment;
10. Simple, stiff and robust connection to the main structure;
11. Steering angle each side for adequate low speed turning circle; and
12. Suitable geometry when retracted to withstand marine impact loads.

In the retractable front wheel suspension assembly, the headstock and fork are connected to a conventional spring and damper unit by means of a linkage system. The suspension unit sits inside the hull. Wheel retraction is obtained by moving the pivot point of either of the top or the bottom arm, which tilts the headstock, fork, and wheel. The spring damper and retraction actuator can be combined or separate, and located in a variety of positions.

Steering input is transferred through a folding linkage system and a ball joint.

This system achieves steering cancellation/reduction on wheel retraction by moving the centre of the steering ball joint towards the centre line of the handle bar steering axis.

Advantages of this arrangement are:
The pivot points of the linkages can be easily sealed where they "pierce" through the hull;
Changing the geometry of the front suspension can be achieved by selecting different length linkage arms. The geometry can be changed without affecting the design of the main body structure;
There is an anti-dive effect during braking, inherent in the design;
The wheel swings away from the body during retraction, leaving more freedom in the hull design, especially in the bow section (the shape of the bow section has understandably proven critical to marine performance);
The suspension unit can be kept inside the hull to avoid corrosion;
The retraction motion can be achieved by a compact linear actuator, for example with a relatively small stroke (90 mm). The actuator can also be packaged inside the hull; and
Retracting the wheel does not cause any significant vertical movement of the headstock, therefore the body cavity can be smaller (this is not so important in the upright position, because it is all above the water line, but the self righting effect if capsized is improved.

Accordingly, the present invention provides a retractable wheel and/or trackdrive assembly, or amphibian, as set out in the appended claims.

Preferred embodiments of the present invention will now be described by way of example only with reference to the accompanying drawings, in which:

FIG. 3 is a schematic perspective view of the front retractable wheel assembly of FIG. 1 in a protracted position;

FIG. 4 is a schematic perspective view of the front retractable wheel assembly of FIG. 1 in a retracted position; and FIG. 5 is a schematic perspective view of a rear retractable wheel assembly according to a preferred embodiment of the present invention in a retracted position.

Figure 1:
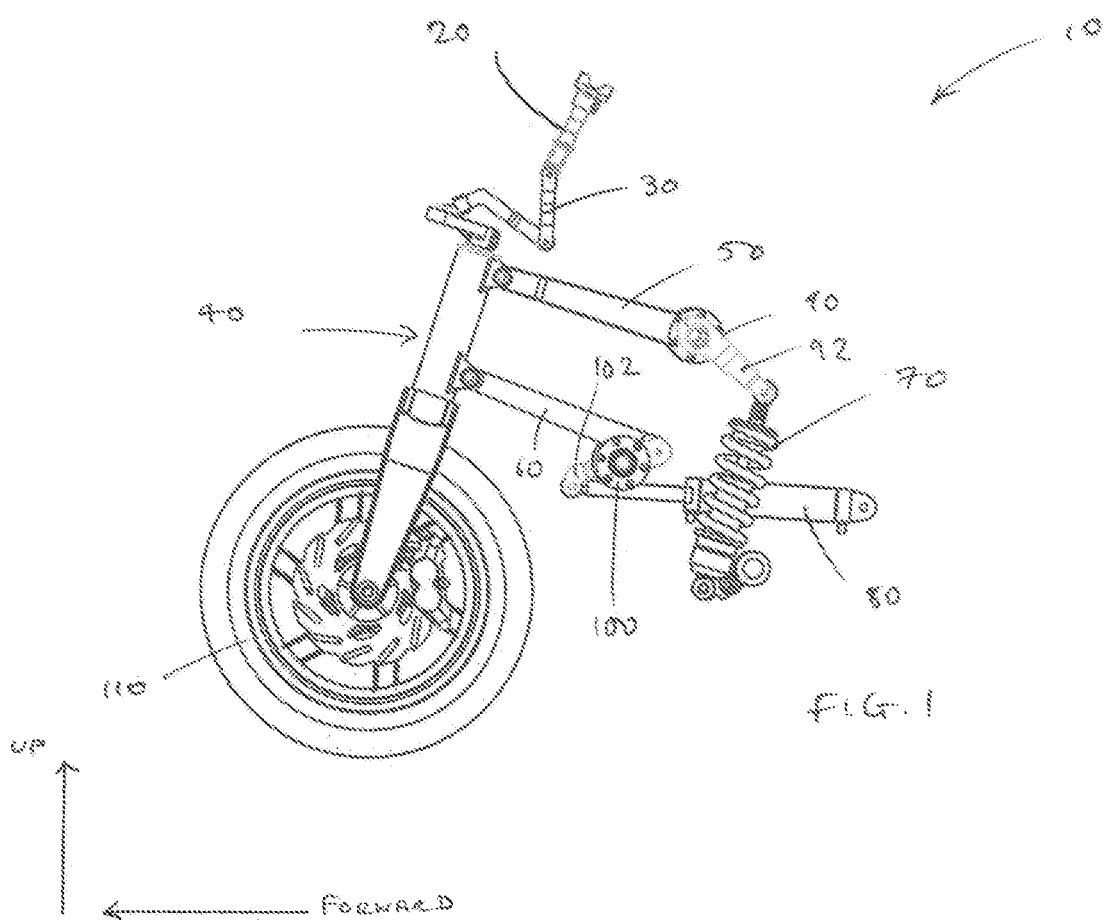
FIG. 1 is a schematic side elevation view of a front retractable wheel assembly according to a first preferred embodiment of the present invention in a protracted position.
Figure 2:
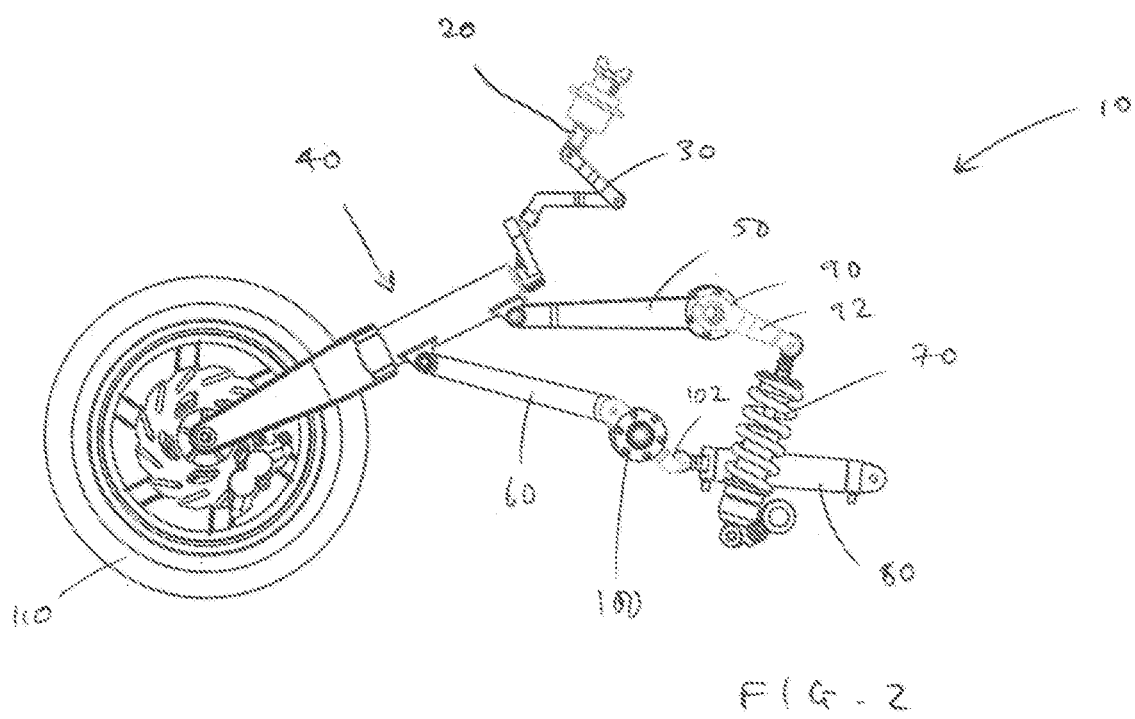
FIG. 2 is a schematic side elevation view of the front retractable wheel assembly of FIG. 1 in a retracted position.

Referring first to FIGS. 1 to 4, a first preferred embodiment of the retractable front wheel assembly 10 according to the present invention can be seen to comprise a girder type double wishbone design. The assembly comprises a steering head 20, a steering linkage 30, a suspension upright 40, an upper control arm (upper wishbone) 50, a lower control arm (lower wishbone) 60, a spring/damper 70, a retraction ram 80, pivots 90, 100 and wheel 110. The retractable front wheel assembly 10 is arranged as shown in FIGS. 1 and 3 in a protracted position, and as shown in FIGS. 2 and 4 in a retracted position. The suspension provides suspension travel, and operates a conventional motorcycle spring damper unit 70 via a lever arm 92. Retraction is performed by a hydraulic ram 80, operated via a lever 102 to move the pivot point of the lower control arm (lower wishbone) 60 forwards. This provides wheel retraction to the desired place, without any compression/extension of the suspension spring of the spring/damper 70. All mountings to the chassis are simple circular bearings or bushes, and as such the water is sealed out of the body by way of circular lip seals. The steering linkage operates through a scissor type linkage to a ball joint atop the main wheel steering shaft. It is shown in its engaged position in FIGS. 1 and 3, and in the retracted/cancelled position in FIGS. 2 and 4. As seen in FIG. 4, when retracted, the ball joint atop the steering arm moves in line with the handle bar steering axis, hence the handle bars turn, and the wheel remains stationary.

Referring next to FIG. 5, a preferred embodiment of the retractable rear wheel assembly 200 according to the present invention can be seen. The system provides adequate motion, wheel spring rate and damping for on-land motorcycle use, as well as positioning the wheel in a suitable position for minimal drag and spray in marine mode. It is a rigid, sealed drive unit, providing for simple sealing to the hull. The rear wheel 210 is located by a single sided swing arm 220, which encloses a shaft drive to a bevel drive unit 230. Suspension motion is transmitted from the wheel 210 to the spring damper unit 240 by a lever 250. The assembly is shown in the retracted position in FIG. 5. Wheel retraction is effected by hydraulic ram 260, which extends and moves the spring damper unit 240 pivot point backwards, the extended spring damper unit 240 pulling the wheel up. Other methods of actuation may be used. The rear suspension is mounted and sealed to the chassis by conventional circular bushings and lip seals. An evolution of this system (not shown) is to include a combined spring/damper/hydraulic ram in a single unit. This provides advantages for packaging and weight.

It will be appreciated from the foregoing that the features of the first embodiment described above are:
a girder front fork that is connected to the chassis by an upper and lower control arm.
the upper control arm is attached to the chassis by a fixed pivot point, and operates a spring damper unit via a lever.
the lower control arm is attached to the chassis via a moveable, eccentric pivot. This movable pivot is attached via a lever to a retraction actuator. The actuator is arranged so that when changing to marine mode, the lower control arm pivot is extended largely forwards, which swings the front wheel upwards and forwards.

In an alternative embodiment, not shown, the retraction function of the upper and lower control arm is swapped, such that:
the girder front fork is connected to the chassis by an upper and lower control arm, as before.
the lower control arm (rather than the upper control arm) is now attached to the chassis by a fixed pivot point, and operates a spring damper unit via a lever.
the upper control arm (rather than the lower control arm) is now attached to the chassis via a moveable, eccentric pivot. This movable pivot is attached via a lever to a retraction actuator. The actuator is arranged so that when changing to marine mode, the upper control arm pivot is moved largely rearwards, which swings the front wheel upwards and forwards. The effect of the configuration in this embodiment is that the wheel does not get pushed so far forwards when retracted when compared with the first embodiment described above.

Whilst wheels have been described throughout as the land propulsion means, track drives or individual track drives (i.e. to replace a single wheel) may be used as an alternative or in combination with wheels. As such a reference to wheel or wheels in the description and claims is to be construed as including a track drive or track drives.

Each feature disclosed in this specification (including the accompanying claims and drawings) may be replaced by alternative features serving the same, equivalent or similar purpose, unless expressly stated otherwise. Thus, unless expressly stated otherwise, each feature disclosed is one example only of a generic series of equivalent or similar features. In addition, all of the features disclosed in this specification (including the accompanying claims and drawings), and/or all of the steps of a method or process, may be combined in any combination, except combinations where at least some of such features and/or steps are mutually exclusive. Accordingly, while different embodiments of the present invention have been described above, any one or more or all of the features described, illustrated and/or claimed in the appended claims may be used in isolation or in various combinations in any embodiment. As such, any one or more feature may be removed, substituted and/or added to any of the feature combinations described, illustrated and/or claimed. For the avoidance of doubt, any one or more of the features of any embodiment may be combined and/or used separately in a different embodiment with any other feature or features from any of the embodiments.

Whereas the present invention has been described in relation to what is presently considered to be the most practical and preferred embodiments, it is to be understood that the invention is not limited to the disclosed arrangements but rather is intended to cover various modifications and equivalent constructions included within the scope of the appended claims.

The invention claimed is:

1. A retractable single front wheel or track drive assembly for an amphibian comprising a single front wheel or track drive, the retractable single front wheel or track drive assembly comprising:
   an actuator;
   a suspension assembly movable between a protracted position and a retracted position; and
   a single front wheel or track drive, wherein:
   when the suspension assembly is protracted then the suspension assembly supports and/or holds the single front wheel or track drive in a ground engaging position for use on land; and
   the front single wheel or track drive is moved forward and upwards on retraction,
   the retractable single front wheel or track drive assembly further comprising:
   an upper control arm;
   a lower control arm;
   a suspension upright for connection to a chassis of the amphibian by the upper and lower control arm, wherein:
   the upper control arm is attached to the chassis via a fixed pivot point; and
   the lower control arm is attached to the chassis via a moveable, eccentric pivot.

2. A retractable single front wheel or track drive assembly for an amphibian comprising a single front wheel or track drive, the retractable single front wheel or track drive assembly comprising:
   an actuator;
   a suspension assembly movable between a protracted position and a retracted position; and
   a single front wheel or track drive, wherein:
   when the suspension assembly is protracted then the suspension assembly supports and/or holds the single front wheel or track drive in a ground engaging position for use on land; and
   the front single wheel or track drive is moved forward and upwards on retraction,
   the retractable single front wheel or track drive assembly further comprising:
   an upper control arm;
   a lower control arm;
   a suspension upright for connection to a chassis of the amphibian by the upper and lower control arm, wherein:
   the lower control arm is attached to the chassis via a fixed pivot point; and
   the upper control arm is attached to the chassis via a moveable, eccentric pivot.

3. The retractable single front wheel or track drive assembly for an amphibian as claimed in claim 1 further comprising a retractable single rear wheel or track drive assembly comprising a single rear wheel or track drive, the retractable single rear wheel or track drive assembly comprising:
   an actuator;
   a suspension assembly movable between a protracted position and a retracted position; and
   a single rear wheel or track drive, wherein:
   when the suspension assembly is protracted then the suspension assembly supports and/or holds the single rear wheel or track drive in a ground engaging position for use on land; and
   the single rear wheel is moved upwards on retraction.

4. An amphibian comprising the retractable single front wheel or track drive assembly as claimed in claim 1.

5. The amphibian as claimed in claim 4 comprising only two wheels and which is configured as an amphibian motorcycle.

6. The amphibian as claimed in claim 4 comprising three wheels and which is configured as an amphibian tricycle.

7. The amphibian as claimed in claim 6 wherein the three wheels are arranged two at the front, and one at the rear.

8. The amphibian as claimed in claim 6 wherein the three wheels are arranged one at the front, and two at the rear.

9. The retractable single front wheel or track drive assembly for an amphibian as claimed in claim 2 further comprising a retractable single rear wheel or track drive assembly comprising a single rear wheel or track drive, the retractable single rear wheel or track drive assembly comprising:
   an actuator;
   a suspension assembly movable between a protracted position and a retracted position; and
   a single rear wheel or track drive, wherein:
   when the suspension assembly is protracted then the suspension assembly supports and/or holds the single rear wheel or track drive in a ground engaging position for use on land; and
   the single rear wheel is moved upwards on retraction.

10. The amphibian comprising the retractable single front wheel or track drive assembly as claimed in claim 2.

11. The amphibian as claimed in claim 10 comprising only two wheels and which is configured as an amphibian motorcycle.

12. The amphibian as claimed in claim 10 comprising three wheels and which is configured as an amphibian tricycle.

13. The amphibian as claimed in claim 12 wherein the three wheels are arranged two at the front, and one at the rear.

14. The amphibian as claimed in claim 12 wherein the three wheels are arranged one at the front, and two at the rear.

15. A retractable single front wheel or track drive assembly for an amphibian comprising a single front wheel or track drive, the retractable single front wheel or track drive assembly comprising:
- an actuator;
- a suspension assembly movable between a protracted position and a retracted position; and
- a single front wheel or track drive, wherein:
- when the suspension assembly is protracted then the suspension assembly supports and/or holds the single front wheel or track drive in a ground engaging position for use on land, and
- the front single wheel or track drive is moved forward and upwards about an eccentric pivot in a non-constant arcuate path on retraction.

\* \* \* \* \*

UNITED STATES PATENT AND TRADEMARK OFFICE
CERTIFICATE OF CORRECTION

PATENT NO. : 10,926,595 B2
APPLICATION NO. : 15/579724
DATED : February 23, 2021
INVENTOR(S) : Gibbs et al.

It is certified that error appears in the above-identified patent and that said Letters Patent is hereby corrected as shown below:

On the Title Page

Inventors, Line 2:
"Nuneaton" should be – Nuneaton, Warwickshire –

Assignee, Line 2:
"Warwickshire" should be – Nuneaton, Warwickshire –

In the Specification

Column 1, Line 64:
"span" should be – spans –

Column 3, Line 31:
"position," should be – position), –

Column 4, Line 44:
"moveable" should be – movable –

Column 4, Line 59:
"moveable" should be – movable –

In the Claims

Column 5, Claim 1, Line 57:
"arm" should be – arms –

Column 5, Claim 1, Line 62:
"moveable" should be – movable –

Signed and Sealed this
Twenty-second Day of August, 2023

*Katherine Kelly Vidal*

Katherine Kelly Vidal
*Director of the United States Patent and Trademark Office*

Column 6, Claim 2, Line 15:
"arm" should be – arms –

Column 6, Claim 2, Line 20:
"moveable" should be – movable –

Column 7, Claim 15, Line 18:
"land," should be – land; –